Jan. 21, 1964 F. S. HARRIS 3,119,073

DIODE PARAMETRIC AMPLIFIER

Filed April 25, 1960 4 Sheets-Sheet 1

INVENTOR.
FRANCIS SAMUEL HARRIS
BY Alfred H Rosen
ATTORNEY

DIODE PARAMETRIC AMPLIFIER

Filed April 25, 1960 4 Sheets-Sheet 2

INVENTOR.
FRANCIS SAMUEL HARRIS
BY Alfred H. Rosen
ATTORNEY

INVENTOR.
FRANCIS SAMUEL HARRIS
BY Alfred H. Rosen
ATTORNEY

INVENTOR.
FRANCIS SAMUEL HARRIS
BY Alfred H. Rosen
ATTORNEY

United States Patent Office
3,119,073
Patented Jan. 21, 1964

3,119,073
DIODE PARAMETRIC AMPLIFIER
Francis Samuel Harris, Medfield, Mass., assignor to Microwave Associates, Inc., Burlington, Mass., a corporation of Massachusetts
Filed Apr. 25, 1960, Ser. No. 24,392
1 Claim. (Cl. 330—4.9)

This invention relates to parametric amplifiers, and more particularly to improvements in parametric amplifiers employing a cavity which is resonant to the signal intended to be amplified, and in pump energy sources therefor.

The parametric amplifier is particularly valuable as a low-noise amplifier of received radio signals. The negative resistance type of parametric amplifier is especially attractive for use as a receiver input amplifier and similar uses, because it preserves exactly the signal frequency despite small drifts in the pump frequency, and is smaller, less expensive and more reliable than many other devices intended for the same purposes. An important, perhaps the most important, theoretical consideration in the design of parametric amplifiers is one of noise figure. The limiting noise figure for a given parametric amplifier is found from the expression:

$$\text{Noise figure} = \frac{(1)+(f_p - f_s)}{f_p}$$

where:
$f_p$=pump frequency, and
$f_s$=signal frequency.

From this expression, it is obvious that it is desirable to use a pump frequency which is many times the signal frequency.

My copending application Serial No. 785,385, filed January 7, 1959, for Reactance Amplifiers, discloses a parametric amplifier employing a cavity which is made resonant simultaneously to at least the signal and idler frequencies, and can be made resonant simultaneously to all three of the signal, pump and idler frequencies. This is a convenient structure, which is simple compared to other structures designed for the same functions, and it is operative with pump frequencies which are a few (e.g., 3 or 4) to many (e.g., 8 to 10) times the signal frequency. My present invention is directed to improving the operation of parametric amplifiers with pump frequencies which are many times the signal frequency, and to the provision of new structures which will make such operation more easily useful and which will afford flexibility of application to existing circuits, and equipment.

According to the invention, a signal circuit, for example, a cavity, is made tunable to resonate with a signal in a given band, such as the "L"-band (800 to 1400 mc./sec., approximately) and a pump energy circuit for a pump frequency many times the signal frequency, for example, a section of "X"-band waveguide, is made adjustable to both an "X"-band pump frequency and a frequency equal to the idler frequency and the two circuits are linked with a voltage-variable reactance element in such a manner that the signal frequency is amplified at the expense of the pump frequency energy without substantially introducing idler or pump energy into the signal circuit, and this is done in a unique structural arrangement which permits a parametric amplifier to be made in two separate functional components one of which is, in the absence of pump energy, merely a tuned circuit which passes signal energy, and the other of which is a source of pump energy which includes provisions for terminating the idler frequency. Such a pump energy source can be permanently attached to or fabricated with a signal circuit (e.g., a signal cavity), or it can be fabricated as an entirely separate unit, and employed, with a suitable coupling cable, as a pump adaptor for a tuned circuit, for example, an existing tuned circuit, of a radio receiver, amplifier, or other electromagnetic wave translator.

The so-called "idler" frequencies are the sum and difference of the signal frequency and the pump frequency. The upper idler (i.e., the sum of the pump frequency and signal frequency) is a nonregenerative signal, the amplitude of which is determined by the amplitude of the original signal frequency times the ratio of signal-to-idler frequencies. The lower idler (i.e., the difference between pump frequency and signal frequency) is a regenerative signal, the amplitude of which is determined primarily by the amount and degree of reactance provided in the lower idler termination. My present invention contemplates the provision of a pump energy source which includes means to effect a proper termination of the lower idler. Such termination means is easily made an integral part of a pump energy source or of a separate pump adaptor constructed according to the invention. It is thus possible to achieve a negative resistance type parametric amplifier with such a pump energy source, or separate pump adaptor, used according to the invention in electrical conjunction with a signal-tuned circuit.

In conventional radio receivers, receiver noise is usually a substantial fraction of total system noise. The preamplifier and mixer stages of radio receivers contribute their shares to noise. The negative resistance type parametric amplifier, particularly as realized with low-noise variable capacitance ("Varactor") diodes, is foremost among recent improvements which make it possible to reduce the noise figure, that is, to improve the signal-to-noise ratio, of radio receivers. The negative resistance type parametric amplifier is especially attractive for use as a receiver input amplifier, and similar uses, for the reasons mentioned above. However, the advantages afforded by the low-noise capabilities of such amplifiers can be lost or seriously reduced if they are connected into a system through wiring and components which do not have comparable capabilities.

Accordingly, there is provided in one embodiment of the invention, a parametric amplifier which is made of a signal resonant cavity which is juxtaposed with a second cavity of a mixer, and a signal coupling is provided between the two cavities. Pump energy is brought to the signal-tuned cavity as is outlined above. Preferably, the two cavities are made of a single rigid rectangular hollow parallelepipedon provided with a partition separating the two cavities, and signal coupling for amplified or fed-through signal energy is provided through connections to the outside of each cavity, or by removing all or a portion of the separating wall. This embodiment further contemplates the provision of three cavities in such a single rigid structure, the mixer cavity being disposed between the amplifier cavity and a third cavity intended to resonate with a local oscillator signal, and in such cases a mixer crystal is coupled between the mixer and local oscillator cavities, and an output coupling for a down-converted signal from the crystal is then provided for connection to further stages in a receiver, for example, an intermediate frequency amplifier stage. Regardless of the number of cavities provided in any particular single rigid structure this embodiment contemplates that each cavity may be separately tunable.

It is an object of my present invention to provide improved low-noise parametric amplifiers in which the signal frequency circuit is effectively isolated from the pump and idler frequency circuits. Another object is to provide amplifiers of this kind which can operate in conjunction with signal-tuned circuits which are not simultaneously resonated to either the idler or the pump frequency. A further object of the invention is to provide a pump energy source which includes means properly to terminate the lower idler outside the signal circuit. A still further object of the invention is to provide a parametric amplifier in which the signal circuit is combined with mixer and, if desired, local oscillator circuits in a single rigid plural cavity structure which, by eliminating many of the noise generating sources of conventional wiring and components, assures the maximum enjoyment of the low-noise capabilities of the parametric amplifier. An additional object of the invention is to provide an improved parametric amplifier which lends itself to fabrication in a single unit with a mixer and a converter, thereby reducing space and weight requirements, lowering the costs of production and further improving system performance.

The foregoing and other objects and features of the invention will become more apparent from the following description of certain embodiments thereof. This description refers to the accompanying drawing wherein.

Figures 2, 3:
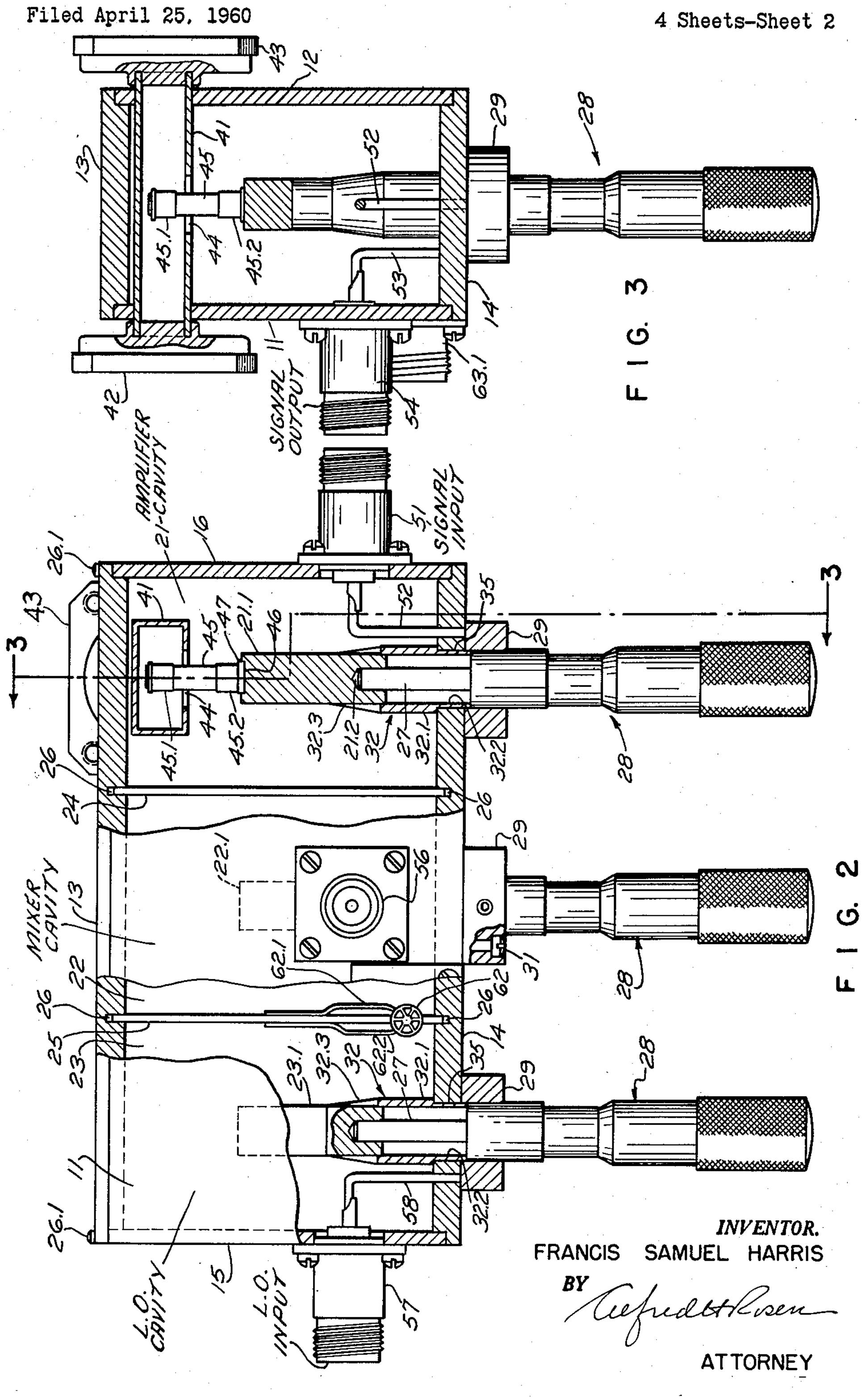
FIG. 2 is a side elevation partly in section of FIG. 1.
FIG. 3 is a section along line 303 of FIG. 2.

Referring in general to FIGS. 1–5, inclusive, a parallelepipedon 10 is made of a first and second side walls 11 and 12, a top wall 13, a bottom wall 14 and first and second end walls 15 and 16. The interior of this parallelepipedon is divided into three cavities 21, 22 and 23 by a first partition 24 between the first and second cavities 21 and 22 and a second partition 25 between the second and third cavities 22 and 23. Each of these partitions is removably held in place in slots 26 in the top and bottom walls 13 and 14. As is shown in FIG. 2, the top wall 13 is removably held attached to the remainder of the structure by screw bolts 26.1. Obviously, the other walls of the parallelepipedon may be similarly connected to each other or some of the walls may be more permanently fastened together if desired.

As is shown in FIGS. 2 and 3 each cavity is fitted with a center conductor 21.1, 22.1 and 23.1, respectively, which is used to tune the cavity, in a manner to be described below. The center conductor 21.1 of the first cavity 21 is provided with a bore 21.2 which has its counterpart in each of the other center conductors. Referring to FIG. 2, at this bore each center conductor is press-fitted on the shaft 27 of an adjusting screw 28. One such adjusting screw is provided for each cavity and may, for example, be constructed in the fashion of any typical micrometer screw. The adjusting screws are all the same, and the same reference character is used to designate corresponding parts of each. Each adjusting screw has a base 29 which is removably fastened to the bottom wall 14 by means of screws 31, as is shown most clearly in FIG. 1.

A cylindrical spring-finger fitting 32 comprising a main body 32.1, a mounting section 32.2 of reduced outer diameter and a spring-finger section 32.3 made by cutting a plurality of radial slots through the body at the end opposite the mounting section is mounted in the lower wall 14 by inserting its mounting section 32.2 through a hole 35 in that wall. Each cavity is similarly fitted with one of the hollow spring-fingered members 32 and the center conductor 21.1, 22.1, or 23.1 of each cavity is slidably mounted in it in firm mechanical contact with its spring fingers 32.3. The base 29 of each adjusting screw 28 is mounted collinearly with the hollow spring fingered member 32 of the associated cavity. By means of this structure, the entire tuning mechanism including the center conductor of any cavity can be removed simply by removal of the mounting screws 31 of the adjusting screw 28 of that cavity. A particular advantage of this structure will be mentioned below in connection with the parametric amplifier cavity 21.

Referring now to the parametric amplifier cavity 21, a section of waveguide 41 passes through and directly across the upper portion of this cavity closely under the top wall 13. This waveguide section is conveniently supported in and through the two side walls 11 and 12 to which it is directly electrically connected, and is preferably fitted with waveguide couplings 42 and 43 at its ends. A hole 44 in the lower wide wall of the waveguide section 14 is provided so that a voltage-variable capacitance ("Varactor") diode 45, having electrical connections 45.1 and 45.2 at its ends, may be passed freely through it for penetration of one of said connections 45.1 into the waveguide. The diode 45 is mounted on the center conductor 21.1 of the amplifier cavity 21, through the means of a shallow bore 46, in which a fitting 47, adapted to hold the lower end connector 45.2 of the diode 45 is affixed. When it is desired to have access to an existing diode 45, for the purpose of changing it, for example, it is necessary only to remove the mounting screws 31 and the base 29 of the adjusting screw 28 of the amplifier cavity 21, and then the entire tuning assembly including the central post 21.1 and the diode 45 can be removed by pulling them through the spring-finger fitting of that cavity.

Figure 1:
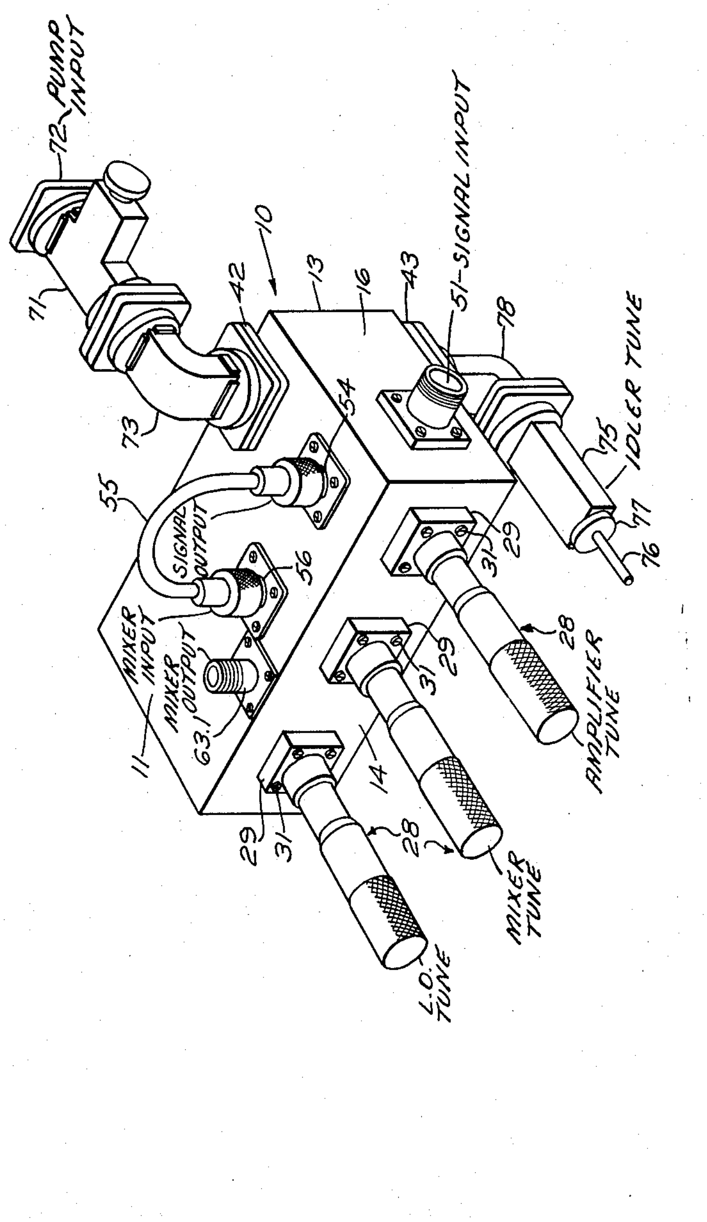
FIG. 1 is an isometric view of a three-cavity combined parametric amplifier, mixer and down-converter, according to the invention.
Figures 4, 7:
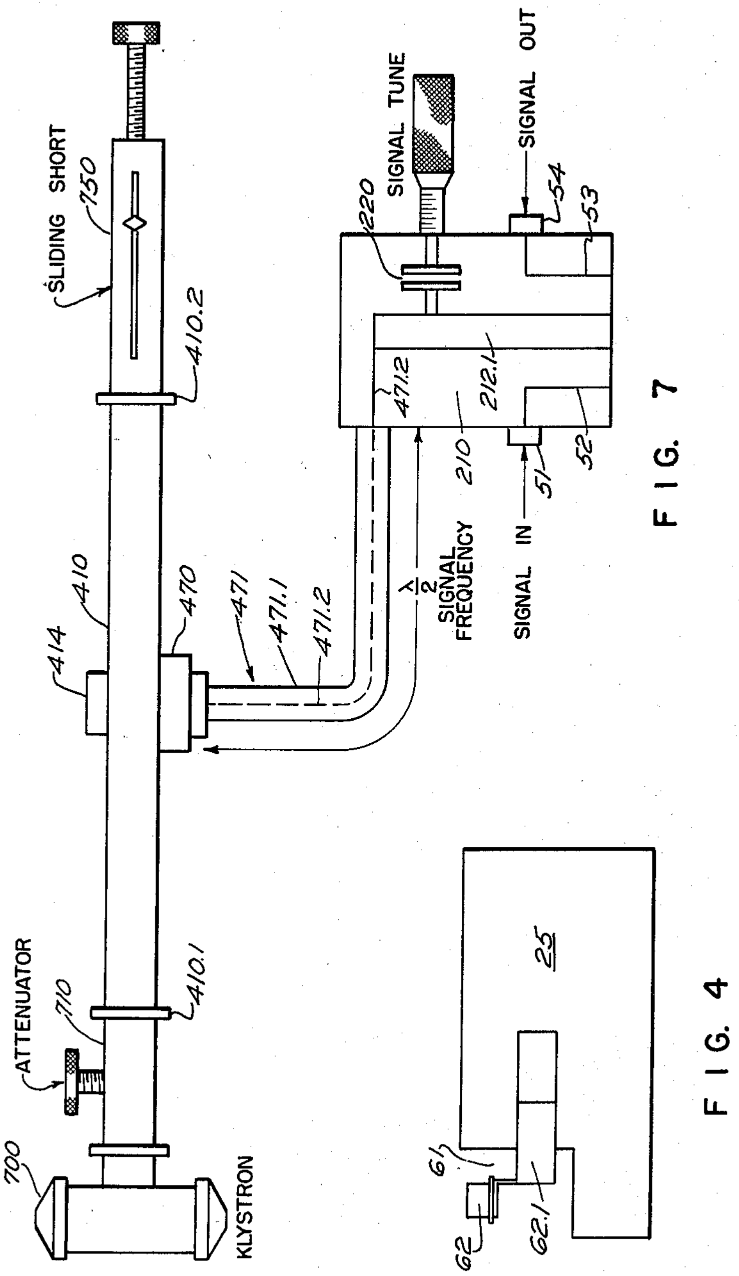
FIG. 4 is a side view of the partition between the mixer and local oscillator cavities in FIGS. 1–3.
FIG. 7 is a schematic diagram of another embodiment of a parametric amplifier, illustrating the use of a pump energy source as a separate pump adaptor for a separate signal cavity, according to the invention.
Figure 5:
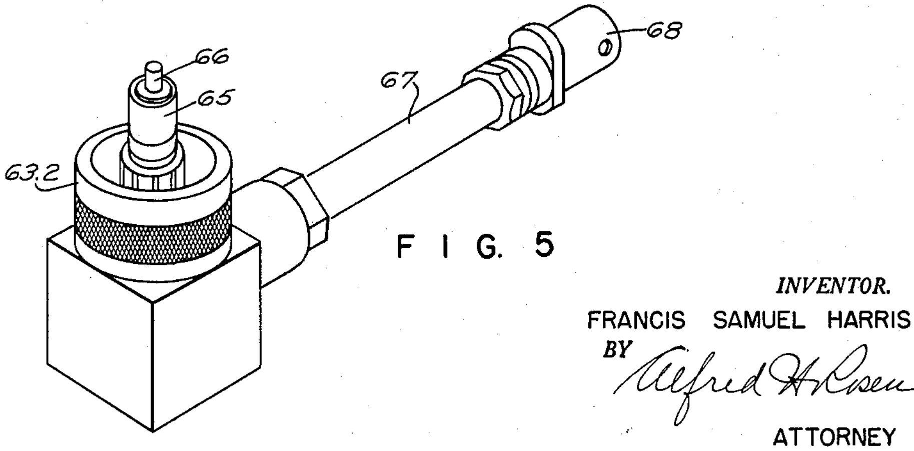
FIG. 5 is an isometric view of an output coupling for I.F. energy.

The device shown in the drawings is provided with fittings for various purposes as follows. A signal input coupling connector 51 shown at the right-hand end of FIG. 2, couples an input signal which is to be amplified to the amplifier cavity 21 by means of a signal input coupling loop 52. Amplified signals of the same frequency as the input signal are taken from the amplifier cavity 21 by means of an output coupling loop 53, and a signal output coupling connector 54. As is shown in FIG. 1 a coaxial coupling cable 55 carries the amplified signal energy from the parametric amplifier to the mixer cavity via a mixer signal input coupling connector 56. A coupling loop (not shown) similar to the coupling loops 52 and 53 of the amplifier is provided within the mixer cavity 22 at the signal input coupling connector 56. A local oscillator input coupling connector 57, shown at the left-hand end of FIG. 2, couples local oscillator signals to the local oscillator cavity 23 through coupling loop 58. The second partition 25 separating the mixer and local oscillator cavities 22 and 23, respectively, is provided with an aperture 61 (shown in FIG. 4) in the form of a notch in one corner, which couples the two cavities together. Disposed in this notch is a socket 62 for one end 66 of a mixer diode (shown in FIG. 5). This socket is mounted on a pair of arms 62.1 and 62.2 which are soldered at their ends to either side of the second partition 25 and stretch around the sides forward toward the notch and upward as shown in FIGS. 2 and 4, to support the socket 62 therein. A mixer output coupling fitting 63.1 of a type suitable for mixer crystal diodes is mounted on the first side wall 11 as shown in FIGS. 1 and 3. The companion portion 63.2 of the mixer output coupling is shown in FIG. 5, holding a mixer diode 65 at one end, and showing at the other end of the diode the pin 66 which is fitted into the mixer output socket 62 when the mixer output coupling 63.1 and 63.2 is assembled. A coaxial cable 67 runs from the output fitting to a connector 68 for connection to other circuits, such as an I.F. amplifier.

The pump energy circuit comprised of the waveguide section 41 and coupling flanges 42 and 43 is fitted as follows. An attenuator 71 (shown in FIG. 1) is coupled to one coupling flange 42, for amplitude control of microwave energy (for example, in the range from 8 kmc./sec. to 12.5 kmc./sec.), supplied by a source (not shown) via the outermost coupling flange 72. The waveguide elbow 73 shown in FIG. 1 is an optional convenience, and may be omitted, if not needed. A matching termination 75, which is essentially a movable short which is adjustable by means of a threaded shaft 76 and adjusting nut 77, is coupled to the other coupling flange 43, via an optional elbow 78. The matching termination adjusts the waveguide section from the voltage variable capacitance diode 45 to the movable short element (not shown) for resonance to the idler frequency.

The structure shown in FIGS. 1 to 5 will be recognized as suitable for use as the input signal amplifier, local oscillator and mixer down-converter of a high frequency radio receiver. Its mode of operation is as follows.

The parametric amplifier comprising the cavity 21 and associated pump energy source structure is an amplifier of the negative resistance type. The waveguide section 41 and elements coupled to its ends are used both to bring pump energy in the microwave frequency spectrum to the amplifier and to terminate the idler frequency. The amplifier cavity 21 is resonated only to the signal frequency and is tightly coupled through the cable 55 to the crystal mixer-down-converter comprised of the local oscillator and mixer cavities 23 and 22, respectively, and the associated mixer diode 65 and the mixer output coupling connector 63.1 and 63.2. As has been indicated above, the amplifier and mixer cavities 21 and 22 are intended to be resonated with signals ranging for example, from 700 to 1400 megacycles per second. The amplified signal from the amplifier cavity 21 to the mixer cavity 22 is converted in the usual manner to an intermediate frequency by beating with a local oscillator frequency in the local oscillator cavity 23 which may be, for example, 30 megacycles per second higher or lower than the signal frequency.

As will be appreciated from the foregoing description, three separately tuned cavities are provided, one (21) for the parametric amplifier, one (22) for the mixer and one (23) a local oscillator. The internal conductor 21.1 of the parametric amplifier tunes the cavity for resonance in a coaxial mode at the signal frequency. The signal frequency, being far below the pump frequency, is beyond cut off for the waveguide 41 and essentially does not enter the waveguide. The signal frequency does, however, beat with the pump frequency in the variable capacitance diode 45 and both pump and idler (i.e., difference between pump and signal frequencies) propagate in the waveguide 41, which is adjusted for resonance to the idler frequency by means of the matching termination 75. As is mentioned above, by the provision of a pump frequency which is several times (e.g., 8 to 10) the signal frequency, idler noise is reduced. If desired, the possibility of interference effects between the harmonics of the local oscillator and the pumping frequency may be reduced or avoided entirely by providing that the coupling cable 55 between the amplifier and the mixer cavities 21 and 22 will function as or include a low-pass filter having a cut off frequency of approximately 1.5 to 2 times the signal frequency.

It is also possible to achieve satisfactory coupling between the amplifier and mixer cavities 21 and 22, respectively, by removing entirely the first partition 24 and omitting the coupling connection 55 and the associated coupling connectors 54 and 56 and their coupling loops. In the latter case the parametric amplifier and mixer cavities become essentially one cavity affording both functions.

The purpose of the local oscillator cavity 23 is to provide a convenient means of coupling between a local oscillating source (not shown) and the crystal mixer 65. Tuning of this cavity is accomplished in the same manner as for the mixer cavity through the medium of the internal conductor 23.1. Any standard crystal and intermediate frequency output connection may be employed; FIG. 5 illustrates one useful structure.

Any convenient X-band signal source capable of delivering approximately 100 mw. to 200 mw. of power and capable of being tuned over a 10 percent frequency range can be used as the pump energy supply. For example, a klystron (as shown in FIG. 7) and an appropriate power supply therefor (not shown) may be used.

In use, a combined unit according to FIG. 1 is connected to the signal source, for example, the antenna of a radio receiver at the signal input coupling connector 51 and to a local oscillator at the local oscillator input coupling connector 57. In this condition, and without a source of pump energy the unit can be used as a low-noise receiver front end. The reason for this is that the parametric amplifier cavity 21 being tuned for resonance to the signal passes the received signal through to the amplifier output coupling connector 54 substantially without attenuation. Connection of a source of pump energy to the waveguide section 41, as described above, will cause amplification of incoming signals and provide an amplified signal to the mixer cavity. Thus, if the pump supply is turned off and the amplifier ceases to amplify, the unit will continue to act as a converter without requiring retuning of the amplifier controls. This will be accompanied by a loss in the signal level of approximately 15 db and a loss in noise figure of approximately 8 db.

Figure 6:
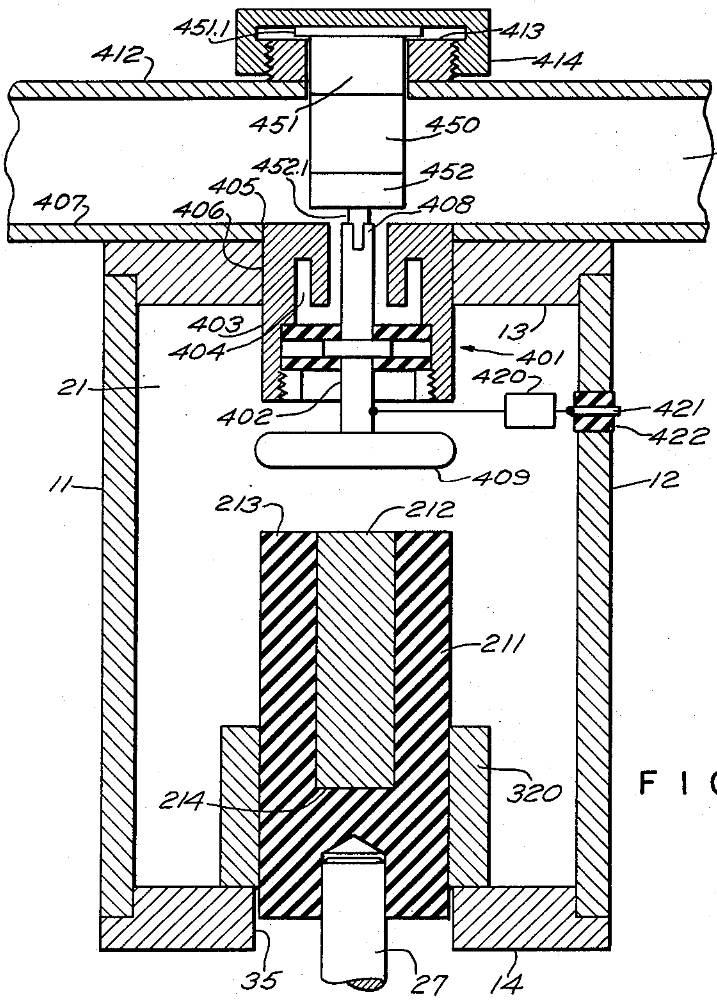
FIG. 6 is a vertical section of another embodiment of a parametric amplifier according to the invention.

FIG. 6 is a sectional view taken in a plane parallel to the sectional planes of FIG. 3 and illustrates another and somewhat more complex, embodiment of the parametric amplifier of the invention. The signal cavity 21, side walls 11 and 12, the top and bottom walls 13 and 14, the hole 35 in the latter and the adjusting screw shaft 27, are practically identical with the corresponding parts of FIGS. 1–3, with modifications to be described below. The pump energy waveguide 410 is mounted outside the signal cavity 21, on the outer surface of the top wall 13, and a coaxial connection 401, comprising essentially an inner conductor 402 and an outer conductor 403 provided with a pump frequency choke 404, is mounted in collinear openings 405 and 406, in the lower wall 407 of the waveguide 410 and the top wall 13, respectively. The coaxial connection 401, including its choke portion 404, is of a well-known form, and will not be further described. The inner conductor has a socket 408 at its end within the waveguide 410 and a capacitor plate 409 transversely mounted on its other end within the signal cavity 21. The upper wall 412 of the waveguide 410 is fitted on its outer surface with an externally threaded collar 413 and an internally threaded cap 414, of the kind used in crystal holders. A voltage variable capacitance diode 450, electrically similar to the diode 45 in FIGS. 1–3, has one electrode 451 provided with a flange 451.1 which is adapted to be clamped between the collar 413 and cap 414, and the other electrode 452 provided with a pin 452.1 which is adapted to fit within the socket 408 of the inner coaxial conductor 402, when the diode is in place as shown in the drawings.

A cylindrical metal collar 320 is mounted on the inner surface of the lower wall 14 of the signal cavity 21 concentric with the opening 35 therein, and an elongated dielectric cylindrical member 211, having a shorter piece of elongated metal 212 centrally and axially disposed within it, is mounted on the adjusting screw shaft 27, in the same manner as the center conductor 21.1 of FIGS. 1–3, for slidable adjustable movement within the collar 320. The inner metal piece 212 extends from the end 213 of the dielectric member remote from the shaft 27 toward but not into contact with the shaft. The collar 320 and the inner end 214 of the inner metal piece 212 over-lap each other by an amount dependent upon the adjustment of the shaft 27, so that, at the signal frequency, the inner metal piece 212 and the collar 320 are capacitively coupled through the dielectric material of the dielectric member 211. The inner metal piece 212 is thus a tuning conductor, capable of tuning the cavity 21 to a given signal frequency equivalent to the center conductor 21.1 of FIGS. 1–3, inclusive, and differing therefrom essentially in that it is capacitively coupled to the outer cavity walls, rather than directly coupled through sliding conductive contacts as in FIGS. 1–3.

Movement of the tuning conductor 212 and its dielectric sheath 211 not only tunes the cavity 21, but also varies the spacing between the pump source capacitor plate 409 and the inner end 213 of the dielectric member 211 and the tuning conductor 212, and thus the degree of capacitive coupling of signal energy to the diode 450. Simultaneously, the capacitive coupling between the tuning conductor 212 and the collar 320 is varied in the opposite direction.

The particular advantages of the embodiment of FIG. 6 are as follows: Provision of the choke 404 prevents pump and idler energy from entering the signal cavity 21. Provision of the capacitively coupled center tuning conductor 212 avoids difficulties which are characteristic of moving ohmic contacts. The use of a mount for the diode 450 which rigidly holds the diode at both ends and gives access to it from outside the structure is preferred for environments where vibration may be encountered and for ease of changing the diode.

A resistor 420 is connected between the inner coaxial conductor 402 and a terminal 421 mounted in an insulator 422 through a wall 12 of the cavity 21. This connection to the inner coaxial conductor 402 provides a D.C. return path for the diode 450 which may be brought out through any wall of the cavity 21 and is useful as a means of monitoring the pump power in the diode. This power can be measured with a high impedance vacuum tube voltmeter operated in a suitable range and suitably shunted (e.g., operated in the 0 to 1 volt range shunted by a half megohm resistor), or by means of a suitable ammeter (e.g., at 0–20 microamp. meter) connected between the terminal 421 and ground.

The pump source structure of FIG. 6 lends itself to use as a completely separate pump adaptor for signal cavities like signal cavity 21, in the manner shown in FIG. 7. Here the waveguide 410 has a klystron 700 connected to it at one end 410.1 through an adjustable attenuator 710 (corresponding to the attenuator 71 in FIG. 1), and a sliding short 750 (corresponding to the idler matching termination 75 in FIG. 1) connected to it at its other end 410.2. The holder for the diode 450 (not shown in FIG. 7) is the same as that in FIG. 6, including the choke 404 and inner coaxial conductor 402 (both not shown in FIG. 7) and the cap 414. The capacitor plate 409 of FIG. 6 is omitted in FIG. 7, and a coaxial line 471 is connected to the coaxial fitting 403 and inner conductor 402 (both not shown in FIG. 7) in any well-known fashion represented symbolically by the coaxial connector 470. The coaxial line 471 is adjusted in electrical length for half-wave resonance with the signal frequency, and is connected at the other end to the signal cavity 210 (corresponding to the signal cavity 21 in FIG. 1), the outer conductor 471.1 being connected to the cavity wall and the inner conductor 471.2 being connected (or if desired capacitively or inductively coupled) to the inner conductor 212.1 of the cavity 210. Signal input and output connectors and coupling loops, 51, 52 and 53, 54, respectively, are as in FIG. 1. A variable capacitor 220 is provided between the inner conductor 212.1 and the outer wall of the cavity for tuning the cavity to the signal frequency. Clearly, any signal tuned cavity, such as the cavity 21 of FIG. 1, or one of the cavity structures described in my above-mentioned copending application may be supplied with pump energy by means of the pump adaptor of FIG. 7. In the latter case it will not be necessary to tune the cavity for resonance to the idler frequency.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claim.

What is claimed is:

A microwave parametric amplifier of the negative resistance type comprising a conductive housing, conductor means extending substantially along an axis of said housing for providing a coaxial system to propagate energy at a signal frequency, means to adjust said conductor means axially within said housing for tuning said coaxial system to said signal frequency, a section of rectangular waveguide having first and second ends, said waveguide being adapted to propagate energy at a second frequency of the order of ten times greater than said signal frequency, means to couple a source of pump energy at said second frequency to said first end, an aperture opening into said waveguide intermediate said ends, a semiconductor diode having a nonlinear capacitive characteristic, gas dielectric capacitor means in series with said diode for coupling said diode between one end of said conductor means and an opposing interior wall of said waveguide, said capacitor means being adjustable with axial movement of said conductor means for adjusting the coupling between said coaxial system and said waveguide, said diode being mounted at one terminal on said one end of said conductor means, and extending along the axis of said coaxial system into said waveguide through said aperture, said diode being thereby movable with said conductor means during adjustment of said conductor means axially within said housing, an axially movable termination at said second end of said waveguide to tune the portion of said waveguide between said diode and said termination relative to the lower idler frequency resulting from mixing said first and second frequencies in said diode, and means coupled to said conductor means for coupling out of said housing an amplifier signal at said signal frequency.

References Cited in the file of this patent

UNITED STATES PATENTS

| | | |
|---|---|---|
| 2,536,051 | Frank et al. | Jan. 2, 1951 |
| 2,790,150 | Hanthorn | Apr. 23, 1957 |
| 2,951,207 | Hudspeth | Aug. 30, 1960 |
| 2,962,676 | Marie | Nov. 29, 1960 |
| 2,970,275 | Kurzrok | Jan. 31, 1961 |
| 3,018,443 | Bloom et al. | Jan. 23, 1962 |

OTHER REFERENCES

Weber: "Electronics," April 17, 1959, page 39.

Edwards: "Proceedings of the IRE," November 1947, pages 1181–1191.

Chang et al.: "Proceedings of the IRE," July 1958, pages 1383–1386.

Rossard: "Proceedings of the IRE," July 1959, pages 1269–1271.

Younger et al.: "Proceedings of the IRE," July 1959, pages 1271–1272.

Reed: "IRE Transactions on Electron Devices," April 1959, pages 216–224.